United States Patent [19]
Gillis et al.

[11] Patent Number: 5,492,876
[45] Date of Patent: Feb. 20, 1996

[54] SOLUTION PROCESS FOR THE PREPARATION OF POLYMERS OF α-OLEFINS

[75] Inventors: Daniel J. Gillis, Harrowsmith; Vaclav G. Zboril; Millard C. Hughson, both of Kingston, all of Canada

[73] Assignee: Novacor Chemicals (International) S.A., Villars-sur-Glane, Switzerland

[21] Appl. No.: 190,750

[22] Filed: Feb. 1, 1994

Related U.S. Application Data

[63] Continuation-in-part of Ser. No. 945,962, filed as PCT/CA91/00116, Apr. 5, 1991, published as WO91/17193, Nov. 14, 1991, abandoned.

[30] Foreign Application Priority Data

May 2, 1990 [GB] United Kingdom .................. 9009901

[51] Int. Cl.[6] .............................. B01J 31/36; B01J 31/38
[52] U.S. Cl. ...................... 502/113; 502/107; 502/110; 502/119; 502/125; 502/126; 526/116
[58] Field of Search ..................... 502/110, 107, 502/113, 119, 125, 126

[56] References Cited

U.S. PATENT DOCUMENTS

| | | | |
|---|---|---|---|
| 4,008,358 | 2/1977 | Abe et al. | 526/116 |
| 4,483,938 | 11/1984 | Rees | 502/113 |
| 4,537,869 | 8/1985 | McDaniel | 502/107 |
| 4,704,376 | 11/1987 | Blenkers et al. | 502/104 |
| 4,769,428 | 9/1988 | Zboril et al. | 526/84 |
| 4,831,000 | 5/1989 | Miro | 502/110 |

FOREIGN PATENT DOCUMENTS

| | | | |
|---|---|---|---|
| 0660869 | 4/1963 | Canada . | |
| 0703704 | 2/1965 | Canada . | |
| 0056684 | 7/1982 | European Pat. Off. . | |
| 0057050 | 8/1982 | European Pat. Off. . | |
| 0131420 | 1/1985 | European Pat. Off. | 526/116 |
| 0222504 | 5/1987 | European Pat. Off. . | |
| 0373785 | 6/1990 | European Pat. Off. . | |

*Primary Examiner*—Asok Pal
*Attorney, Agent, or Firm*—Bruce E. Harang

[57] ABSTRACT

A solution process, and a catalyst therefor, for the preparation of high molecular weight polymers of alpha-olefins viz. homopolymers of ethylene and copolymers of ethylene and $C_3$–$C_{12}$ alpha-olefins, is disclosed. The process is operated under solution polymerization conditions at 105°–320° C. The catalyst is obtained from titanium tetrahalides, vanadium oxytrihalides and organoaluminum compounds, in which an admixture of catalyst components is heat-treated at 180°–250° C. and subsequently cooled to a temperature of less than 150° C. Additional vanadium oxytrihalide is then added. The resultant catalyst solution is activated with an aluminum compound. The catalyst has good activity, showing superior activity to catalysts in which additional vanadium oxytrihalide is not added or added at temperatures above 150° C.

6 Claims, No Drawings

SOLUTION PROCESS FOR THE PREPARATION OF POLYMERS OF α-OLEFINS

This application is a continuation-in-part of prior application Ser. No. 07/945,962, filed as PCT/CA91/00116, Apr. 5, 1991, published as WO91/17193, Nov. 14, 1991, and entitled Solution Process for the Preparation of Polymers of Alpha-Olefins, now abandoned.

The present invention relates to a process for the preparation of polymers of alpha-olefins, especially homopolymers of ethylene and copolymers of ethylene and higher alpha-olefins, in a solution process for the preparation of polymers of alpha-olefins in which alpha-olefin monomer is polymerized in the presence of a heat-treated coordination catalyst capable of being used at relatively high polymerization temperatures, especially temperatures above 150° C.

Polymers of ethylene, for example, homopolymers of ethylene and copolymers of ethylene and higher alpha-olefins, are used in large volumes for a wide variety of end-uses, for example, in the form of film, fibers, moulded or thermoformed articles, pipe, coatings and the like.

There are two types of processes for the manufacture of polyethylene that involve the polymerization of monomers in an inert liquid medium in the presence of a coordination catalyst viz. those which operate at temperatures below the melting or solubilization temperature of the polymer and those which operate at temperatures above the melting or solubilization temperature of the polymer. The latter are referred to as "solution" processes, an example of which is described in Canadian Patent 660 869 of A. W. Anderson, E. L. Fallwell and J. M. Bruce, which issued 1963 April 9. In a solution process, the process is operated so that both the monomer and polymer are soluble in the reaction medium. Accurate control over the degree of polymerization, and hence the molecular weight of the polymer obtained, may be achieved by control of the reaction temperature.

There are a number of advantages to a solution polymerization process, for example the ability to control the molecular weight of the polymer obtained, the ability to operate the process as a continuous process and to recover the polymer by precipitation without the need for washing, the efficient use of catalyst, the properties of the polymer obtained and the possibility of efficient use of energy. However, part of the catalyst remains in the polymer. Such catalyst, which may be referred to as "catalyst residue", may contribute to the colour of the polymer obtained and to degradation of the polymer during or subsequent to processing of the polymer. The mount of catalyst residue is related, at least in part, to the overall activity of the catalyst employed in the polymerization step of the process as the higher the overall activity of the catalyst the less catalyst that is, in general, required to effect polymerization at an acceptable rate. Catalysts of relatively high overall activity are therefore preferred in solution polymerization processes.

Two important factors in determining the overall activity of a catalyst are the instantaneous activity of the catalyst and the stability of the catalyst under the operating conditions, especially at the operating temperature. Many catalysts that are stated to be very active in low temperature polymerization processes also exhibit high instantaneous activity at the higher temperatures used in solution processes, but tend to decompose within a very short time in a solution process, with the result that the overall activity is disappointingly low. Such catalysts are of no commercial interest for solution processes. Other catalysts may exhibit acceptable overall activity at the higher temperatures of a solution process but show tendencies to yield polymers of broad molecular weight distribution or of too low a molecular weight to be commercially useful for the manufacture of a wide range of useful products. Thus, the requirements for and the performance of a catalyst in a solution polymerization process are quite different from those of a catalyst in a low temperature polymerization process, as will be understood by those skilled in the art.

The preparation of polymers of ethylene in the presence of heat-treated polymerization catalysts is described in published European patent applications No. 57 050 of V. G. Zboril, M. A. Hamilton and R. W. Rees, published 1982 Aug. 04, and No. 56 684 of V. G. Zboril and M. A. Hamilton, published 1982 Jul. 28. The preparation of polymers of ethylene in the presence of heat-treated polymerization catalysts containing alkyl siloxalanes is described in European patent application No. 131 420 of M. A. Hamilton, D. A. Harbourne, C. G. Russell, V. G. Zboril and R. Mulhaupt, published 1985 Jan. 16. The preparation of polymers of ethylene in the presence of heat-treated polymerization catalysts containing aluminoxanes is described in European patent application No. 222 504 of V. G. Zboril and R. Mulhaupt, published 1987 May 20.

A solution polymerization process for the preparation of homopolymers of ethylene and copolymers of ethylene and higher alpha-olefins, in which the catalyst is a coordination catalyst prepared by heat-treating a particular admixture of a titanium halide, vanadium oxytrihalide and an organoaluminum compound, cooling the resultant composition, adding additional vanadium oxytrihalide and then activating with an aluminum compound has now been found.

Accordingly, the present invention provides a solution process for the preparation of high molecular weight polymers of alpha-olefins selected from the group consisting of homopolymers of ethylene and copolymers of ethylene and $C_3$–$C_{12}$ higher alpha-olefin, said process comprising feeding monomer selected from the group consisting of ethylene and mixtures of ethylene and at least one $C_3$–$C_{12}$ higher alpha-olefin, a coordination catalyst and inert hydrocarbon solvent to a reactor, polymerizing said monomer at a temperature in the range of 105°–320° C. and recovering the polymer so obtained, said coordination catalyst having been obtained by combining a first component with a second component, said first component being prepared by the sequential steps of (i) admixing a solution of an organoaluminum compound in inert hydrocarbon solvent with a solution of titanium tetrahalide and vanadium oxytrihalide in inert hydrocarbon solvent at a temperature of less than 30° C. and heating the resultant admixture to a temperature of 180°–250° C., preferably 200°–220° C., for a period of from 15 seconds to 5 minutes, preferably 30 seconds to 2 minutes, (ii) cooling the resultant solution to a temperature of less than 150° C., preferably less than 100° C., and (iii) admixing the cooled solution with a solution of vanadium oxytrihalide in inert hydrocarbon solvent so as to increase the mount of vanadium in the cooled solution on an atomic basis by at least 10%, and preferably by at least 20%, such that:

(A) the organoaluminum compound of step (i) is a compound of the formula $AlR_nX_{3-n}$;

B) the organoaluminum compound of the second component is selected from the group consisting of compounds of the formula $AlR_nX_{3-n}$, alkyl siloxalanes and aluminoxanes;

(C) in the aluminum compounds of (A) and (B), R is alkyl, cycloalkyl, aryl or alkyl-substituted aryl and has 1–20 carbon atoms; n=1, 1.5, 2 or 3 and X is halogen;

(D) the atomic ratio in step (i) of aluminum to titanium plus vanadium is in the range 0.2–3.0, preferably 0.8–1.6;

(E) the atomic ratio in the coordination catalyst fed to the reactor of aluminum to titanium plus vanadium is in the range 0.8–7.0, preferably 2.0–5.0;

(F) the ratio of vanadium to titanium on an atomic basis in step (i) is at least 0.05:1, preferably in the range 0.15–0.25:1; and (G) the ratio of vanadium to titanium on an atomic basis in the coordination catalyst fed to the reactor is in the range of 0.15–4.0:1, preferably in the range 0.5–2.0:1.

In an embodiment of the process of the present invention, the aluminum compound of (B) is an aluminoxane, especially an aluminoxane of the formula $R'_2AlO(R'AlO)_mAlR'_2$, where each $R'$ is independently selected from the group consisting of alkyl, cycloalkyl, aryl or alkyl-substituted aryl and has 1–20 carbon atoms and m is 0 or an integer.

In another embodiment, the aluminum compound of (B) is an alkyl siloxalane, especially an alkyl siloxalane of the formula $R''_3SiO(R''_2SiO)_mAlR''_2$, where each $R''$ is independently selected from the group consisting of alkyl, cycloalkyl, aryl or alkyl-substituted aryl and has 1–20 carbon atoms.

In a further embodiment, the aluminum compound of (A) is diethyl aluminum chloride.

In another embodiment the catalyst components are mixed in-line and fed to the reactor without separation of any fraction therefrom.

The present invention also provides a coordination catalyst for the preparation of high molecular weight polymers of alpha-olefins, said catalyst having been obtained by combining a first component with a second component, said first component having been prepared by the sequential steps of (i) admixing a solution of an organoaluminum compound in inert hydrocarbon solvent with a solution of titanium tetrahalide and vanadium oxytrihalide in inert hydrocarbon solvent at a temperature of less than 30° C. and heating the resultant admixture to a temperature of 180°–250° C., preferably 200°–220° C., for a period of from 15 seconds to 5 minutes, preferably 30 seconds to 2 minutes, (ii) cooling the resultant solution to a temperature of less than 150° C., preferably less than 100° C., and (iii) admixing the cooled solution with a solution of vanadium oxytrihalide in inert hydrocarbon solvent so as to increase the mount of vanadium in the cooled solution on an atomic basis by at least 10%, preferably at least 20%, such that:

(A) the organoaluminum compound of step (i) is a compound of the formula $AlR_nX_{3-n}$;

(B) the organoaluminum compound of the second component is selected from the group Consisting of compounds of the formula $AlR_nX_{3-n}$, alkyl siloxalanes and aluminoxanes;

(C) in the aluminum compounds of (A) and (B), R is alkyl, cycloalkyl, aryl or alkyl-substituted aryl and has 1–20 carbon atoms; n=1, 1.5, 2 or 3 and X is halogen;

(D) the atomic ratio in step (i) of aluminum to titanium plus vanadium is in the range 0.2–3.0, preferably 0.8–1.6;

(E) the atomic ratio in the coordination catalyst fed to the reactor of aluminum to titanium plus vanadium is in the range 0.8–7.0, preferably 2.0–5.0;

(F) the ratio of vanadium to titanium on an atomic basis in step (i) is at least 0.05:1, preferably in the range 0.15–0.25:1; and (G) the ratio of vanadium to titanium on an atomic basis in the coordination catalyst fed to the reactor is in the range of 0.15–4.0:1, preferably in the range 0.5–2.0:1.

The present invention is directed to a process for the preparation of high molecular weight polymers of alphaolefins, such polymers being intended for fabrication into articles by extrusion, injection moulding, thermoforming, rotational moulding and the like. In particular, the polymers of alpha-olefins are homopolymers of ethylene and copolymers of ethylene and higher alpha-olefins i.e. hydrocarbon alpha-olefins of the ethylene series, especially such higher alpha-olefins having 3 to 12 carbon atoms i.e. $C_3$–$C_{12}$ alpha-olefins, examples of which are 1-butene, 1-hexene and 1-octene. The preferred higher alpha-olefins have 4–10 carbon atoms. In addition cyclic endomethylenic dienes may be fed to the process with the ethylene or mixtures of ethylene and $C_3$–$C_{12}$ alpha-olefin. Such polymers are known.

In the process of the present invention, monomer, a coordination catalyst and inert hydrocarbon solvent are fed to a reactor. The monomer may be ethylene or mixtures of ethylene and at least one $C_3$–$C_{12}$ alpha-olefin, preferably ethylene or mixtures of ethylene and one $C_4$–$C_{10}$ alpha-olefin.

The coordination catalyst is formed by combining a first component with a second component. The first component is prepared by the sequential steps of (i) admixing a solution of an organoaluminum compound in inert hydrocarbon solvent with a solution of titanium tetrahalide and vanadium oxytfihalide in inert hydrocarbon solvent at a temperature of less than 30° C. and heating the resultant admixture to a temperature of 180°–250° C., preferably 200°–220° C., for a period of from 15 seconds to 5 minutes, preferably 30 seconds to 2 minutes, (ii) cooling the resultant solution to a temperature of less than 150° C., preferably less than 100° C., and (iii) admixing the cooled solution with a solution of vanadium oxytrihalide in inert hydrocarbon solvent.

In step (i), the first component is obtained by admixing, rapidly, a solution of an organoaluminum compound in inert hydrocarbon solvent with a solution of titanium tetrahalide and vanadium oxytrihalide in inert hydrocarbon solvent at a temperature of less than 30° C. The organoaluminum compound is a compound of the formula $AlR_nX_{3-n}$, in which R is alkyl, cycloalkyl, aryl or alkyl-substituted aryl and has 1–20 carbon atoms; n=1, 1.5, 2 or 3 and X is halogen. The preferred aluminum compound added in step (i) is diethyl aluminum chloride. The titanium compound is titanium tetrahalide, especially titanium tetrachloride, and the vanadium compound is vanadium oxytrihalide, especially vanadium oxytrichloride. Alternatively, titanium and/or vanadium alkoxides may be used. The aluminum, titanium and vanadium compounds are admixed so that the atomic ratio of aluminum to titanium plus vanadium is in the range 0.2–3.0, especially in the range of 0.8–1.6. The atomic ratio of vanadium to titanium is at least 0.05:1, especially in the range of 0.15–0.25:1. The preferred ratio may depend on the particular organoaluminum compound used in the preparation of the catalyst. The admixture obtained in step (i) is heat treated at 180°–250° C., especially 200°–220° C., for a period of 15 seconds to 5 minutes, especially 30 seconds to 2 minutes.

In step (ii), the solution obtained in step (i) is cooled to a temperature of less than 150° C., and especially to a temperature of less than 100° C. Preferably, the temperature of the solution is in the range is 50°–90° C.

The cooled solution thus obtained is then admixed, in step (iii), with a solution of vanadium oxytrihalide in an inert hydrocarbon solvent. The preferred vanadium compound is vanadium oxytrichloride. The mount of vanadium compound added is such that the atomic ratio of aluminum to titanium plus vanadium is in the range 0.8–7.0, especially in the range of 2.0–5.0, and the atomic ratio of vanadium to titanium is in the range of 0.15–4.0:1, especially in the range 0.5–2.0:1. The mount of vanadium added in step (iii) is at least 10%, and especially at least 20%, on an atomic basis, of the mount added in step (i).

The resultant solution of the first component of the catalyst is then admixed, rapidly, with the second component viz. an organoaluminum compound, and fed to the polymerization reactor. The organoaluminum compound of the second component is selected from the group consisting of compounds of the formula $AlR_nX_{3-n}$, alkyl siloxalanes and aluminoxanes, in which R is alkyl, cycloalkyl, aryl or alkyl-substituted aryl and has 1–20 carbon atoms; n=1, 1.5, 2 or 3 and X is halogen. The atomic ratio in the coordination catalyst fed to the reactor of aluminum to titanium plus vanadium is in the range 0.8–7.0, especially 2.0–5.0:1; an upper limit of 5:1 is especially preferred if the aluminum compound added as the second component is an alkyl siloxalane.

In an embodiment of the process of the present invention, the aluminum compound of the second component is an aluminoxane, especially an aluminoxane of the formula $R'_2AlO(R'AlO)_mAlR'_2$ where each R' is independently selected from the group consisting of alkyl, cycloalkyl, aryl or alkyl-substituted aryl and has 1–20 carbon atoms and m is 0 or an integer. In preferred embodiments, R' is alkyl or cycloalkyl of 1–6 carbon atoms and m is 0 to 4. Preferably the alkyl groups are methyl, ethyl or butyl, especially isobutyl. Examples of such aluminoxanes are $(i-Bu)_2AlOAl(i-Bu)_2$ and $(i-Bu)_2AlOAl(i-Bu)OAl(i-Bu)_2$, and isomers thereof, where i-Bu=isobutyl. Alternatively, the aluminoxane may be of the formula $[R''_2Al—O]_m$ where each R'' is as defined above for R' and m is an integer having a value of at least 2. Methods for the preparation of such aluminoxanes are known in the art.

In another embodiment, the aluminum compound of the second component is an alkyl siloxalane, especially an alkyl siloxalane of the formula $R''_3SiO(R''_2SiO)_mAlR''_2$, where each R'' is independently selected from the group consisting of alkyl, cycloalkyl, aryl or alkyl-substitiuted aryl and has 1–20 carbon atoms. In preferred embodiments, R'' is alkyl or cycloalkyl of 1–6 carbon atoms and m is 0 to 4. Preferably the alkyl groups are methyl or ethyl. Examples of such alkyl siloxalanes are $EtMe_2SiOMe_2SiOAlEt_2$, $Et_2AlSiOMe_3$, $Et_2AlSiOEt_3$, $Et_2AlSiOEtMe_2$ and $EtMe_2SiO(Me_2SiO)_2Me_2SiOAlEt_2$, and isomers thereof, where Me=methyl and Et=ethyl. Methods for the preparation of alkyl siloxalanes are known in the art.

In embodiments in which the organoaluminum compound is of the formula $AlR_nX_{3-n}$, it is preferred that n is 3 or, especially, 2. R is preferably phenyl or alkyl, particularly alkyl of 1–4 carbon atoms. X is preferably bromine or chlorine. In preferred embodiments of the compounds of the above formula, the organoaluminum compound is trialkyl aluminum, especially triethyl aluminum, or dialkylaluminum chloride, especially diethylaluminum chloride.

The first and second components of the catalyst are preferably mixed in-line and fed to the reactor without separation of any fraction therefrom.

The preferred halides of the titanium and vanadium compounds are bromine and especially chlorine.

The concentration of the components of the solutions used in the preparation of the catalyst is not critical and is primarily governed by practical considerations. The combining of the components is exothermic and the resultant evolution of heat is a factor in determining the upper concentration limits of the solutions. Concentrations up to about 50%, on a weight basis, may however be used. The lower concentration limits are related to practical considerations for example, the amount of solvent required, the equipment being used and the like. Concentrations of as low as 25 ppm, on a weight basis, may be used but higher concentrations, for example 100 ppm and above, are preferred.

It is important to admix the two solutions of the first component at ambient or lower temperatures i.e. lower than 30° C., and permit reaction to occur for some minimum time. This time depends on the type of organoaluminum compound used and may be as short as 15 seconds after adequate mixing has been achieved. The subsequent heat treatment of the admixture of the first component may be performed by, for example, heating the admixture in a heat exchanger or by addition of a heated inert hydrocarbon solvent. Heat treatment is carried out at 180°–250° C., especially 200° to 220° C. The admixture should be held at the elevated temperature for a period of time in the range of from 15 seconds to 5 minutes, preferably 30 seconds to 2 minutes, before it is cooled in step (iii).

As exemplified hereinafter, the sequence of steps in the preparation of the catalyst is important in obtaining a catalyst with high activity.

The first component may be fed into the polymerization reactor separately from the second component or the first and second components may be combined prior to being fed to the reactor. Admixing in-line is preferred.

The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process.

The coordination catalyst described herein is used in the process of the present invention without separation of any of the components of the catalyst. In particular, neither liquid nor solid fractions are separated from the catalyst before it is fed to the reactor.

The catalyst described herein may be used, according to the process of the present invention, over the wide range of temperatures that may be used in an alpha-olefin polymerization process operated under solution conditions. For example, such polymerization temperatures may be in the range of 105°–320° C. and especially in the range 105°–310° C. The pressures used in the process of the present invention are those known for solution polymerization processes, for example, pressures in the range of about 4–20 MPa.

In the process of the present invention, the alpha-olefin monomers are polymerized in the reactor in the presence of the catalyst. Pressure and temperature are controlled so that the polymer formed remains in solution.

Small amounts of hydrogen, for example 1–40 parts per million by weight, based on the total solution fed to the reactor, may be added to the feed in order to improve control of the melt index and/or molecular weight distribution and thus aid in the production of a more uniform product, as is disclosed in the aforementioned Canadian Patent 703 704.

The solution passing from the polymerization reactor is normally treated to deactivate any catalyst remaining in the solution. A variety of catalyst deativators are known, examples of which include fatty acids, alkaline earth metal salts of aliphatic carboxylic acids, alcohols and trialkanolamines. The preferred deactivator is a trialkanolamine in which at least one of the alkyl groups is isopropyl, especially triisopropanolamine.

The hydrocarbon solvent used for the deactivator is preferably the same as the solvent used in the polymerization process. If a different solvent is used, it must be compatible with the solvent used in the polymerization process, not cause precipitation of any component of the polymerization mixture and not cause adverse effects on the solvent recovery system associated with the polymerization process.

After de, activation of the catalyst, the solution containing polymer may be passed through a bed of activated alumina or bauxite which removes part or all of the deactivated catalyst residues. It is, however, preferred that the process be operated without removal of deactivated catalyst residues. The solvent may then be flashed off from the polymer, which subsequently may be extruded into water and cut into pellets or other suitable comminuted shapes. The recovered polymer may then be treated with saturated steam at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants and other additives may be added to the polymer either before or after the polymer is initially formed into pellets or other comminuted shapes.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range 0.25:1 to 1:1 with the total amount of antioxidant being in the range of 400 to 2000 ppm.

As is illustrated in the examples below, the heattreated catalyst obtained as described herein exhibits good stability at very high temperatures, and results in the formation of polymer of acceptable colour in high yield. The catalyst may be prepared by in-line mixing of liquid components without isolation, separation and/or purification of any intermediate products, which greatly reduces the cost of using such catalyst.

The process of the present invention may be used to prepare homopolymers of ethylene and copolymers of ethylene and higher alpha-olefins having densities in the range of, for example, about 0.900–0.970 g/cm$^3$ and especially 0.915–0.965 g/cm$^3$; the polymers of higher density, e.g. about 0.960 and above, being homopolymers. Such polymers may have a melt index, as measured by the method of ASTM D-1238, condition E, in the range of, for example, about 0.1–200, and especially in the range of about 0.1–120 dg/min. The polymers may be manufactured with narrow or broad molecular weight distribution. For example, the polymers may have a stress exponent, a measure of molecular weight distribution, in the range of about 1.1–2.5 and especially in the range of about 1.3–2.0.

Stress exponent is determined by measuring the throughput of a melt indexer at two stresses (2160 g and 6480 g loading) using the procedures of the ASTM melt index test method, and the following formula:

$$\text{Stress exponent} = \frac{1}{0.477} \log \frac{\text{(wt. extruded with 6480 g wt.)}}{\text{(wt. extruded with 2160 g wt.)}}$$

Stress exponent values of less than about 1.40 indicate narrow molecular weight distribution while values above about 2.00 indicate broad molecular weight distribution.

The polymers produced by the process of the present invention are capable of being fabricated into a wide variety of articles, as is known for homopolymers of ethylene and copolymers of ethylene and higher alpha-olefins.

Unless otherwise noted, in the examples hereinafter the following procedures were used:

The reactor was a 10 ml (irregular internal shape, depth= 19.1 ram, diameter in the range of 19.2–63.5 mm) pressure vessel fitted with an irregularly shaped agitator (notched disc 61 mm diameter, 6.4 mm thickness; notched cylinder 17.8 mm diameter, 12.5 mm length), a heating jacket, pressure and temperature controllers, three feed lines and an outlet line. The feed lines were located to form an equilateral triangle centred on the agitator axis, each line at a radial distance of 33 mm from the axis, while the outlet line was axial with the agitator drive shaft. The catalyst precursors and other ingredients were prepared as solutions in cyclohexane which had been purified by being passed through a silica gel bed, stripped with nitrogen and passed through another silica gel bed followed by beds of 4A molecular sieve and of activated alumina.

Ethylene was metered into the reactor as a cylcohexane solution prepared by dissolving gaseous ethylene in purified solvent. The rates of feed of the components of the catalyst were adjusted to produce the desired conditions in the reactor. The desired hold-up times were achieved by adjusting the length of the tubing through which the components were being passed. The reactor pressure was kept constant at 7.5 MPa. The pumping rates and temperatures were maintained constant during each experiment.

The initial (no conversion) monomer concentration in the reactor was 2–3 wt %. A solution of deactivator (triisopropanolamine, 0.3 molar) in toluene was injected into the reactor effluent at the reactor outlet line. The pressure of the stream was then reduced to about 110 kPa (Abs.) and the unreacted monomer was continuously stripped off with nitrogen. The amount of unreacted monomer was monitored by gas chromatograph. The catalyst activity was defined as:

$$Kp = \frac{S.V. \times d[O/(1-O)]}{dc}$$

where Q is the conversion, i.e. the fraction of ethylene (monomer) converted to polymer at the optimum ratio of the first and second components, S.V. is the space velocity in the reactor (held constant at 3.1 min$^{-1}$) and c is the catalyst concentration, based on titanium plus vanadium, in the reactor in mmol/l. Kp was obtained by measuring the conversion Q at various concentrations of the transition metals (Ti, V) in the catalyst. Thus, Kp is a rate constant and therefore a measure of the amount of polymer produced per unit amount of catalyst. An increase in the value of Kp indicates a more active catalyst i.e. more polymer produced per unit amount of catalyst.

The present invention is illustrated by the following examples. In the examples the solvent was cyclohexane and the monomer was ethylene unless specified to the contrary.

EXAMPLE I

Catalyst was prepared in the manner described above, from solutions of titanium tetrachloride, vanadium oxytrichloride and diethylaluminum chloride in cyclohexane. The admixed solutions were heat treated at 205°–210° C. for 110–120 seconds by admixing with hot cyclohexane solvent. The resulting solution was then cooled, by addition of additional, cooled, solvent to a temperature in the range of 85°–100° C. Additional amounts of "additional catalyst" viz. vanadium oxytrichloride in cyclohexane, were then added; in comparative experiments, this addition step involved addition of cyclohexane that did not contain vanadium oxytrichloride. After a further period of about 10 seconds, a solution of an activator viz. tetra(isobutyl) aluminoxane, in cyclohexane was added to activate the catalyst. The reactor polymerization was operated at a temperature of 140° C. The solution passing from the reactor was deactivated and polymer recovered, as described above. Catalyst activity was calculated.

In one run (Run 4), the process was operated with additional catalyst being added but without cooling the heat-treated catalyst solution prior to admixing with additional catalyst; the catalyst solution fed to the reactor would have been admixed with additional catalyst at a temperature of 190°–200° C., instead of at 85°–100° C.

Runs 2, 1, 1A and 4 were sequential runs, in that order, on the same day; Run 3 was run subsequently. Run 1 is a run of the invention, in which in the preparation of the first component of the catalyst, the solution was cooled and additional catalyst added, as described above. Run 2 differs from Run 1 in that no additional catalyst was added. Run 3 is a run of the invention and differs from Run 1 in that the additional catalyst was a mixture of vanadium oxytrichloride and titanium tetrachloride.

Runs 1A and 4 are comparative runs that differ from Run 1 in that the solution of the first component was not cooled prior to addition of the additional catalyst. Run 1A has the same mount of activator as Run 1 whereas catalyst activity was optimized in Run 4, compared to Run 1A, by adjustment of the amount of additional activator used.

Further experimental details and the results obtained are given in Table I.

TABLE I

| Run* No. | Ti | Catalyst V | DEAC | Additional Catalyst | Activator | Q | $K_p$ | HLMI |
|---|---|---|---|---|---|---|---|---|
| 1A | 1.5 | 0.4 | 2.8 | 1.1 | 4.5 | 88 | 9 | 0.24 |
| 1 | 1.5 | 0.4 | 2.8 | 1.1 | 4.5 | 97 | 36 | 0.10 |
| 2 | 1.5 | 0.4 | 2.8 | 0.0 | 5.3 | 89 | 14 | 0.29 |
| 3 | 1.0 | 1.0 | 3.0 | 0.5/0.13 | 5.5 | 94 | 20 | 0.17 |
| 4 | 1.5 | 0.4 | 2.8 | 1.1 | 5.3 | 94 | 19 | 0.23 |

*DEAC = diethylaluminum chloride
Amounts of catalyst are in micromoles/minute fed to the reactor
HLMI = high load melt index, measured by the procedure of ASTM D-1238 (condition E), but using a 21.6 kg weight instead of 2.16 kg
Runs 1A and 4 are comparative runs in which the catalyst solution was not cooled prior to addition of the additional catalyst.
Run 2 is also a comparative run, without additional catalyst.
In Run 3, the additional catalyst was a mixture of vanadium oxytrichloride and titanium tetrachloride in a ratio of 4:1

This example shows that the catalyst with the additional catalyst gave higher conversion, higher catalytic activity and lower HLMI, and that the degree of improvement is substantially greater than that of Example II below. In addition, this Example shows that cooling of the catalyst solution prior to addition of activator improves catalyst activity and lowers the HLMI of the polymer obtained. The example also illustrates the use of mixed catalysts as the additional catalyst (Run 3).

Runs 1A and 1 illustrate the effect of cooling the catalyst solution prior to addition of additional catalyst, at the same process conditions. Catalyst activity (Kp) increased from 9 to 36 as a result of the cooling step during preparation of the catalyst. Optimization of the process conditions of Run 1A, by adjustment of the mount of activator, as in Run 4, increased Kp from 9 to 19, still substantially inferior to the run of the invention, Run 1.

EXAMPLE II

The procedure of Runs I and 2 of Example I was repeated, except that the catalyst was prepared from solutions of titanium tetrachloride and diethylaluminum chloride in cyclohexane i.e. without vanadium oxytrichloride.

Further experimental details and the results obtained are given in Table II.

TABLE II

| Run* No. | Ti | Catalyst V | DEAC | Additional Catalyst | Activator | Q | $K_p$ | HLMI |
|---|---|---|---|---|---|---|---|---|
| 5 | 1.5 | 0.0 | 2.25 | 1.5 | 3.5 | 85 | 5.8 | 0.33 |
| 6 | 1.5 | 0.0 | 2.25 | 0.0 | 2.5 | 21 | 0.5 | 1.64 |

*Runs 5 and 6 are comparative runs

The results show that a processes in which titanium tetrachloride, instead of both titanium tetrachloride and vanadium oxytrichloride, was used in the formation of the catalyst gave substantially poorer results viz. lower catalyst activity ($K_p$) and a higher HLMI, than obtained when both catalyst components were used.

EXAMPLE III

The procedure of Example I was repeated except that the polymerization reactor was at a temperature of 270° C., instead of 140° C.

Further experimental details and the results obtained are given in Table III.

TABLE III

| Run* No. | Ti | Catalyst V | DEAC | Additional Catalyst | Activator | Q | $K_p$ | $K_2$HLM |
|---|---|---|---|---|---|---|---|---|
| 7 | 3.8 | 3.8 | 7.5 | 0.0 | 7.5 | 76 | 1.3 | — |
| 8 | 3.8 | 1.0 | 7.5 | 0.0 | 7.5 | 42 | 0.5 | — |
| 9 | 3.8 | 1.0 | 7.5 | 2.8 | 11.3 | 81 | 1.8 | — |

*Runs 7 and 8 are comparative runs.

Run 9, compared with Run 8, illustrates the substantial improvement in conversion obtainable by use of the additional catalyst.

EXAMPLE IV

In comparative experiments, using the procedure described above, ethylene was polymerized using two catalyst systems having a Ti:v ratio of 1:1, neither of which had additional catalyst added. The catalyst systems differed in that one system was cooled to a temperature of 85°–100° C. prior to addition of activator, whereas the other system was used at a temperature of 185°–195° C.

Further experimental details and the results obtained are given in Table IV.

TABLE IV

| Run* No. | Ti | Catalyst V | DEAC | Additional Catalyst | Activator | Q | $K_p$ | $K_2$HLM |
|---|---|---|---|---|---|---|---|---|
| 10 | 1.5 | 1.5 | 4.5 | 0.0 | 4.0 | 98 | 42 | 0.26 |
| 11 | 1.5 | 1.5 | 4.5 | 0.0 | 4.0 | 97 | 37 | 0.26 |

*Run 10 used the cooled catalyst.

This example illustrates that cooling of the catalyst without subsequent addition of additional catalyst has no affect on conversion and HLMI, and only a minor affect on catalyst activity.

We claim:
1. A coordination catalyst suitable for the preparation of high molecular weight polymers of alpha-olefins, said catalyst having been obtained by combining a first component prepared by the sequential steps of:

(i) admixing a solution of an organoaluminum compound of the formula $$AlR_nX_{3-n}$$

wherein R is a phenyl radical or a $C_{1-4}$ alkyl radical, X is chlorine or bromine and n is 2 or 3, in inert hydrocarbon solvent with a solution of titanium tetrahalide and vanadium oxytrihalide in inert hydrocarbon solvent at a temperature of less than 30° C. and heating the resultant admixture to a temperature of 180°–250° C. for a period of from 15 seconds to 5 minutes;

(ii) cooling the resultant solution to a temperature of less than 150° C.; and (iii) admixing the cooled solution with a solution of vanadium oxytrihalide in inert hydrocarbon solvent so as to increase the amount of vanadium in the cooled solution on an atomic basis of at least 10%, with a solution of an organoaluminum compound selected from the group consisting of:

a) organoaluminum compounds of the formula:

$$AlR_nX_{3-n}$$

wherein R is a phenyl radical or a $C_{1-4}$ alkyl radical, X is chlorine or bromine and n is 2 or 3;

b) alkyl aluminum siloxalanes of the formula:

$$R''_3SiO(R''_2SiO)_mAlR''_2$$

wherein R'' is a $C_{1-6}$ alkyl radical and m is 0 or an integer from 1 to 4; and c) an aluminoxane compound of the formula:

$$R'_2AlO(R'AlO)_mAlR'_2$$

wherein R' is a $C_{1-6}$ alkyl radical and m is 0 or an integer from 1 to 4;

wherein:

(A) in step (i) the atomic ratio of: aluminum to titanium plus vanadium is in the range of 0.2–3.0:1; and vanadium to titanium is in the range of 0.05:1 to 1.5:1; and (B) in the coordination catalyst the atomic ratio of: aluminum to titanium plus vanadium is in the range of 0.8–7.0:1; and vanadium to titanium is in the range 0.15–4.0:1.

2. The catalyst according to claim 1, wherein in step (i) the organoaluminum compound is diethyl aluminum chloride.

3. The catalyst according to claim 2, wherein the organoaluminum compound added to the first component is an organoaluminum compound of the formula:

$$AlR_nX_{3-n}$$

wherein R is a phenyl radical or a $C_{1-4}$ alkyl radical, X is chlorine or bromine and n is 2 or 3.

4. The catalyst according to claim 2, wherein the organoaluminum compound added to the first component is an alkyl aluminum siloxalane of the formula:

$$R''_3SiO(R''_2SiO)_mAlR''_2$$

wherein R'' is a $C_{1-6}$ alkyl radical and m is 0 or an integer from 1 to 4.

5. The catalyst according to claim 4, said alkyl aluminum siloxalane is selected from the group consisting of $EtMe_2SiOMe_2SiOAlEt_2$, $Et_2AlSiOMe_3$, $Et_2AlSiOEt_3$, $Et_2AlSiOEtMe_2$, and $EtMe_2SiO(Me_2SiO)_2Me_2SiOAlEt_2$, wherein Me is a methyl radical and Et is an ethyl radical.

6. The catalyst according to claim 2 wherein the organoaluminum compound added to the first component is an aluminoxane compound of the formula:

$$R'_2AlO(R'AlO)_mAlR'_2$$

wherein R' is a $C_{1-6}$ alkyl radical and m is 0 or an integer from 1 to 4.

* * * * *